United States Patent [19]

Little et al.

[11] 4,120,114
[45] Oct. 17, 1978

[54] FLY SWATTER WITH EXTENDABLE HANDLE

[76] Inventors: Donald H. Little, c/o George Spector 3615 Woolworth Bldg., 233 Broadway; George Spector, 3615 Woolworth Bldg., 233 Broadway, both of New York, N.Y. 10007

[21] Appl. No.: 751,129

[22] Filed: Dec. 16, 1976

[51] Int. Cl.² ............................................. A01M 3/02
[52] U.S. Cl. .................................................. 43/137
[58] Field of Search ................ 43/137, 135; 273/72 R

[56] References Cited

U.S. PATENT DOCUMENTS

| | | | |
|---|---|---|---|
| 1,179,303 | 4/1916 | Hanlon | 43/137 |
| 1,628,486 | 5/1927 | Azamber | 43/137 |
| 1,885,730 | 11/1932 | Krag et al. | 43/137 |
| 1,967,384 | 7/1934 | Urbanek | 43/137 |
| 1,982,629 | 12/1934 | Bennett | 43/137 |
| 1,991,836 | 2/1935 | Bailey | 43/137 |
| 3,173,688 | 3/1965 | Green | 273/72 |
| 3,412,501 | 11/1968 | Rosen | 43/137 |

*Primary Examiner*—Clifford D. Crowder

[57] ABSTRACT

A fly swatter that includes a flat pad for striking directly against a fly, and the pad being attached to an extendable handle so to permit reaching a fly on a ceiling of a room.

4 Claims, 5 Drawing Figures

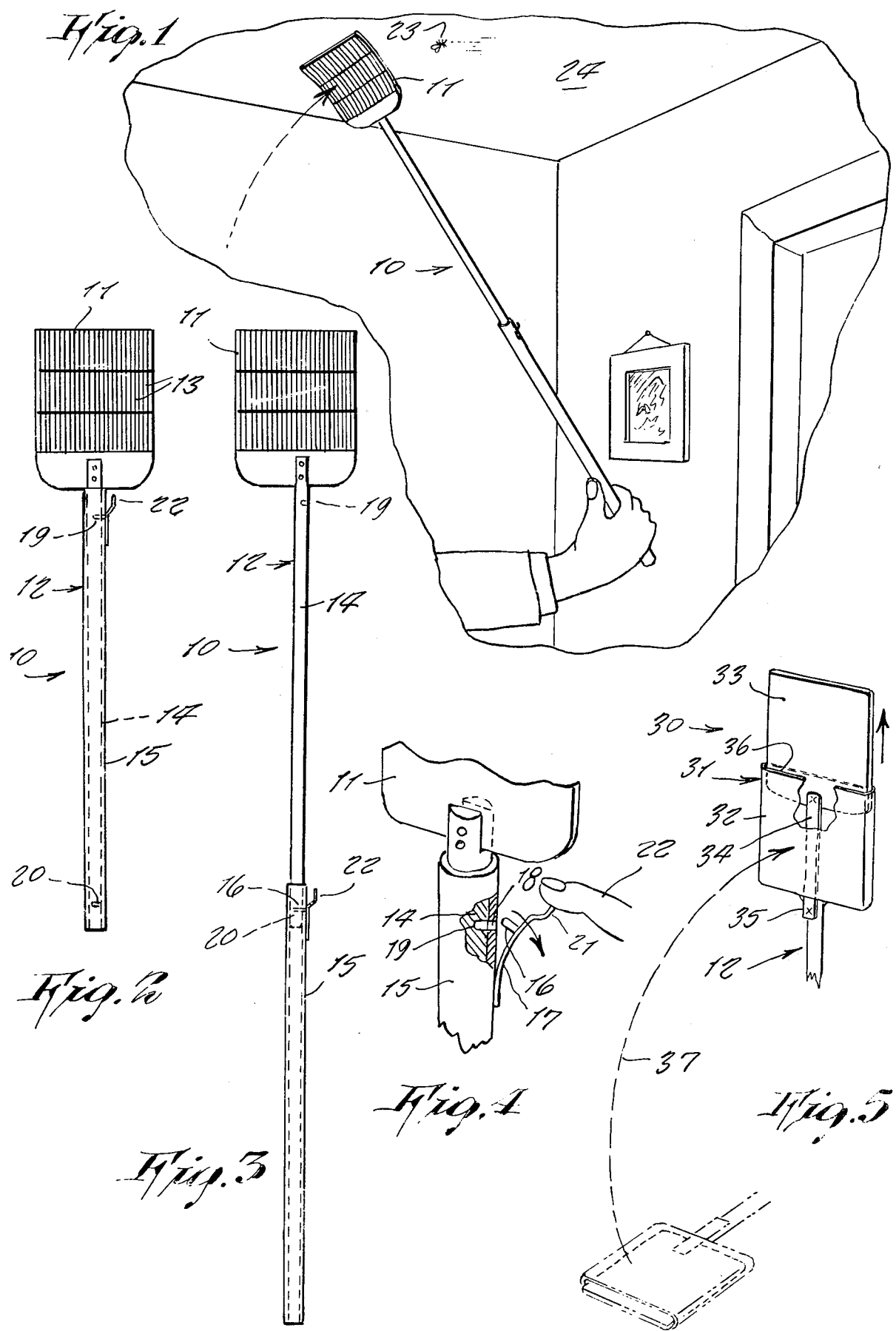

FLY SWATTER WITH EXTENDABLE HANDLE

This invention relates generally to fly swatters.

It is generally well known that flies within a house often land on a ceiling of a room where they cannot be hit by a conventional fly swatter unless a person first climbs up on a chair so to reach it. By the time that the person gets up on the chair, the fly often flies away. Thus the extra effort of climbing up has been useless. Additionally, it is dangerous because the person may fall down and get hurt. This situation is objectionable and is therefore in want of an improvement.

Accordingly, it is a principal object of the present invention to provide a fly swatter having an extendable handle so to reach a fly sitting on a room ceiling.

Another object is to provide an Extend-A-Swat fly swatter which can be also used in a non-extended position so to conventionally swat flies that are in close reach in a lower part of a room.

Still another object is to provide an Extend-A-Swat flay swatter which in a modified design has a striking pad that automatically enlarges during a striking action so to more likely successfully hit the fly even if a person's aim is not too accurate.

Other objects are to provide a Extend-A-Swat which is simple in design, inexpensive to manufacture, rugged in construction, easy to use and efficient in operation.

These and other objects will be readily evident upon a study of the following specification and the accompanying drawing wherein:

FIG. 1 is a perspective view of the Extend-A-Swat shown in extended position so to reach swatting a fly upon a ceiling.

FIG. 2 is a side view thereof in a retracted position.

FIG . 3 is a side view thereof in an extended position.

FIG. 4 is a fragmentary detail view showing the latch pin that holds the device in either retracted or extended positions.

FIG. 5 is a detail of a modified design of the invention in which centrifugal force automatically caused the swatter pad to gradually enlarge during the swing so to form a larger striking surface and thus give less chance for a fly to get away; the initial portion of the swing by being a smaller surface thus allowing a greater speed of travel; this device having one pad slidable inside an outer flat pocket and being tethered by a flat rubber strap that stretches by the centrifugal force.

Referring now to the drawing in greater detail, and more particularly to FIGS. 1 to 4 thereof at this time, the reference numeral 10 represents an Extend-A-Swat fly swatter according to the present invention in which there is a flat striking pad 11 fixedly secured to an extendable handle 12.

The pad may be made of any suitable material such as is used in conventional fly swatters and may comprise either a flat sheet of rubber or plastic, and which may or may not be perforated with small screen openings 13 so the pad has less air resistance during a striking action.

The handle in the present invention comprises an elongated, straight, inner handle member 14 which at one end is affixed to the pad and which is slidable within a tubular straight handle member 15.

A pin 16 mounted on a leaf spring 17 serves to lock the handle members selectively in either a retracted or an extended position. The leaf spring is mounted fixedly on a side of the tubular handle member and is located near an end thereof so that the pin is snap engagable in an opening 18 on the tubular handle member and an opening 19 on the inner handle member 14 when the handle is retracted, or else which is snap engagable in opening 18 and an opening 20 on the inner handle member when the handle is extended. An offset 21 on the leaf spring provides easy means to flip the leaf spring by a person's finger 22.

In operative use, it is now evident that the fly swatter can be used either in a retracted position so to swat flys close by in a conventional manner, or in an extended position so to reach a fly 23 sitting high up on a ceiling 24.

In FIG. 5, a modified design 30 of the invention includes the above-described handle 12 and a striking pad 31 that automatically enlarges during a striking movement, so to more likely hit the fly and not let him get away.

The pad 31 comprises an envelope shaped pad member 32 fixedly attached to the end of inner handle member 14 and which contains a slidable pad member 33 tethered to an elastic tape 34 affixed at one end 35 to the handle member 14, so that the pad member 33 can slide part way only outward of an opening 36 of the pad member 32 during a striking action. This outward sliding motion occurs during the striking action due to centrifugal force as the pad 31 travels along an arc 37 while being directed to hit a fly. Thus the pad 31 has less air resistance during its initial flight by being retracted to minimal size, so that it can travel faster in order to successfully hit the fly before he has a chance to get away. Toward the end of the stroke, the already fast-flying pad enlarges to cover a broader area for being struck. After the strike, the tape automatically contracts the pad to normal minimal size again.

The pad members are likewise made of flexible rubber or plastic.

Thus a modified design is provided.

While various changes may be made in the detail construction, it is understood that such changes will be within the spirit and scope of the present invention, as is defined by the appended claims.

What is claimed is:

1. An extendable fly swatter comprising in combination a striking pad secured to a handle, said pad comprising a fixed member secured to one end of said handle and an extendable member slidably mounted on said fixed member, including means elastically securing said movable member to said handle whereby said movable member can move from a normal unextended position to extended positions, said means biasing said movable member to said unextended position, the movement to the extended positions resulting from centrifugal forces exterted during fly swatting, wherein said movable member and said fixed member having abutting surfaces in all positions providing a swatting surface that is continuous in all positions.

2. A swatter as in claim 1 wherein the handle is telescopically extendable.

3. A swatter as in claim 1 wherein the fixed member has guide surfaces defining a slot which slidably receives said movable member, said means comprises an elastic tether connecting the movable member to the handle, and wherein the movable member is within and in abuttment with said guide surfaces in all positions, said guide surfaces guiding and supporting said movable member, during extension and impact of said striking pad.

4. A swatter as in claim 3 wherein the handle is telescopically extended.

* * * * *